United States Patent
Tang et al.

(10) Patent No.: US 10,623,189 B2
(45) Date of Patent: Apr. 14, 2020

(54) ONLINE/OFFLINE SIGNATURE SYSTEM AND METHOD BASED ON MULTIVARIATE CRYPTOGRAPHY

(71) Applicant: South China University of Technology, Guangzhou (CN)

(72) Inventors: Shaohua Tang, Guangzhou (CN); Jiahui Chen, Guangzhou (CN)

(73) Assignee: South China University of Technology (CN)

( * ) Notice: Subject to any disclaimer, the term of this patent is extended or adjusted under 35 U.S.C. 154(b) by 211 days.

(21) Appl. No.: 15/761,838

(22) PCT Filed: Dec. 23, 2015

(86) PCT No.: PCT/CN2015/098524
§ 371 (c)(1),
(2) Date: Mar. 21, 2018

(87) PCT Pub. No.: WO2017/049790
PCT Pub. Date: Mar. 30, 2017

(65) Prior Publication Data
US 2018/0278426 A1    Sep. 27, 2018

(30) Foreign Application Priority Data
Sep. 22, 2015 (CN) .......................... 2015 1 0607733

(51) Int. Cl.
*H04L 29/06* (2006.01)
*H04L 9/32* (2006.01)
(Continued)

(52) U.S. Cl.
CPC ............ *H04L 9/3247* (2013.01); *H04L 9/083* (2013.01); *H04L 9/0861* (2013.01); *H04L 9/30* (2013.01)

(58) Field of Classification Search
CPC ......... H04L 9/083; H04L 9/0861; H04L 9/30; H04L 9/3247
See application file for complete search history.

(56) References Cited

U.S. PATENT DOCUMENTS

| 9,948,462 | B2 | 4/2018 | Tang et al. |
| 2006/0104441 | A1 | 5/2006 | Johansson et al. |
| 2013/0177151 | A1* | 7/2013 | Sella ..................... H04L 9/3093 380/30 |

FOREIGN PATENT DOCUMENTS

| CN | 1870499 A | 11/2006 |
| CN | 102013983 A | 4/2011 |

(Continued)

OTHER PUBLICATIONS

Chen et al., "Efficient Batch Verification of Online/Offline Short Signature for a Multi-Signer Setting", Wuhan University Journal of Natural Sciences, 2011, pp. 481-486, vol. 16:6.

(Continued)

*Primary Examiner* — Jeffrey C Pwu
*Assistant Examiner* — Thong P Truong
(74) *Attorney, Agent, or Firm* — The Webb Law Firm

(57) ABSTRACT

Disclosed is an offline/online signature system including a key distribution center (KDC) and a signature end, wherein the KDC includes a key generating module, an offline signature module, and a verification module; and the signature end includes an online signature module and a verification module. The key generating module generates a temporary signature required for online signature, and transmits the result to a sensor node for storage. The online signature module generates a signature for a specific message; and the verification module includes a processor and a public key transformation component, wherein the processor (Continued)

transmits the signature to the public key transformation component and determines whether the signature is valid.

8 Claims, 1 Drawing Sheet

(51) Int. Cl.
*H04L 9/08* (2006.01)
*H04L 9/30* (2006.01)

(56) References Cited

FOREIGN PATENT DOCUMENTS

CN 103780383 A 5/2014
WO WO2013/024697 * 2/2013 ............... H04L 9/32

OTHER PUBLICATIONS

Jiao et al., "Improved Multivariate Signature Scheme Based on UOV", Journal of Information Engineering University, 2013, pp. 148-152, vol. 14:2; English-language Abstract included.
Lu et al, "Online/offline multi-signature scheme in standard model", Application Research of Computers, 2010, pp. 3514-3517, vol. 27:9; English-language Abstract included.
Shen et al., "IBUOV, a Provably Secure Identity-Based UOV Signature Scheme", IEEE 16th International Conference on Computational Science and Engineering, 2013, pp. 388-395.
Wang, "Online/Offline Digital Signature Algorithm in Wireless Networks", Journal of Guilin University of Technology, 2013, pp. 339-344, vol. 33:2; English-language Abstract included.

* cited by examiner

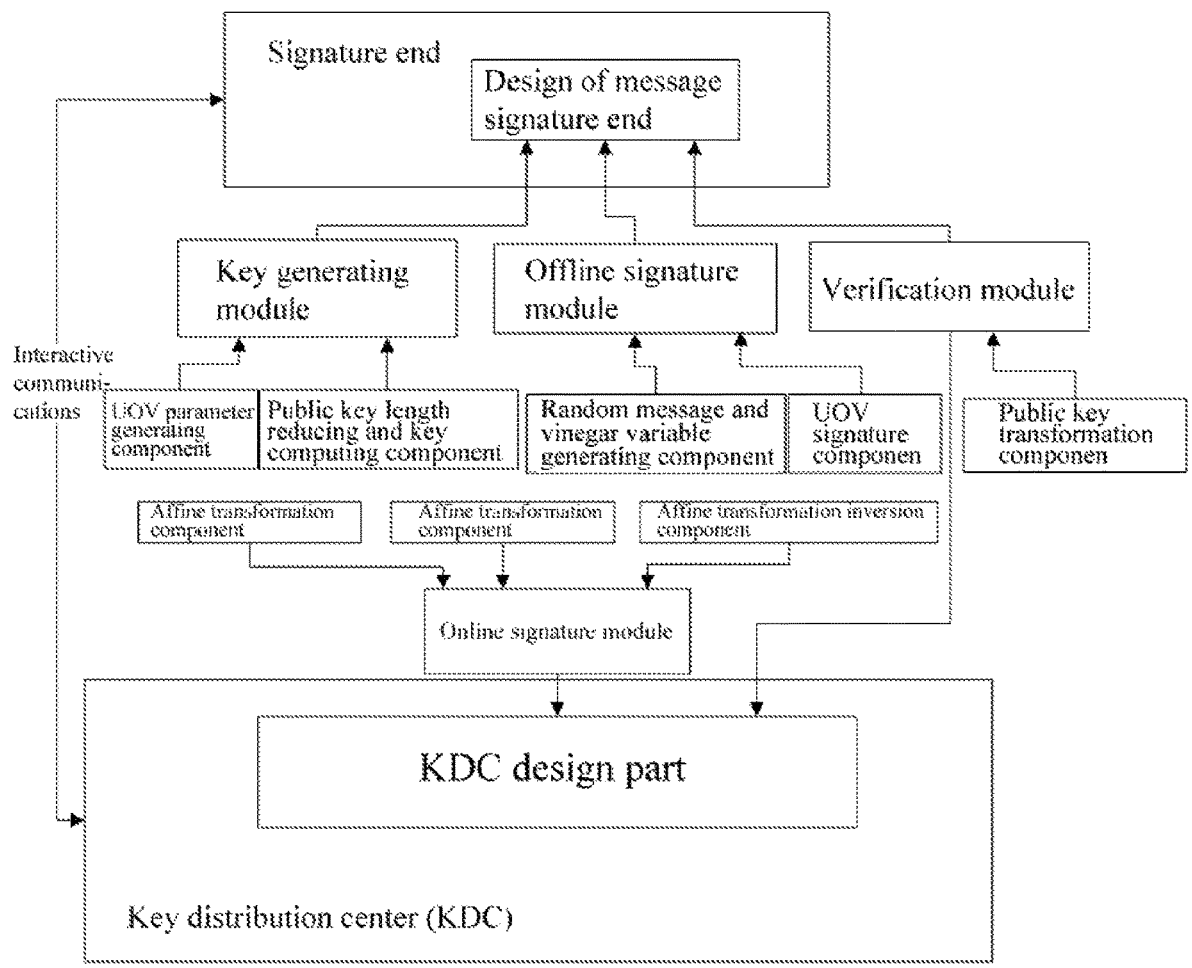

ONLINE/OFFLINE SIGNATURE SYSTEM AND METHOD BASED ON MULTIVARIATE CRYPTOGRAPHY

CROSS-REFERENCE TO RELATED APPLICATIONS

This application is the United States national phase of International Application No. PCT/CN2015/098524 filed Dec. 23, 2015, and claims priority to Chinese Patent Application No. 201510607733.6 filed Sep. 22, 2015, the disclosures of each of which are hereby incorporated by reference in their entireties.

BACKGROUND OF THE INVENTION

Field of the Invention

The present invention relates to the field of information security, and in particular to an online/offline signature system and method based on multivariate cryptography.

Description of Related Art

On one hand, cryptography is the core and basis of information security, and is widely applied to the fields of network communications, e-commerce, banks, national defense and military, etc. Cryptography comprises symmetrical cryptography and asymmetrical cryptography, and the asymmetrical cryptography is also referred to as public key cryptography. At present, the security of public key cryptography primarily relies on difficult problems such as big integer decomposition and discrete logarithm solving, such as RSA and ECC. However, since it is proposed that the method of big integer decomposition and discrete logarithm solving can be implemented on quantum computers, such traditional public key cryptography has been significantly threatened, having influence on various industries. Therefore, efforts have been made to find a cryptography system capable of resisting quantum computer attacks to satisfy the requirements of information security, such system being referred to as a post-quantum cryptography, with multivariate public key cryptography being one of it.

On the other hand, a wireless system is formed by a plurality of message signature ends deployed in a monitoring region, and communicates in a wireless manner. The biggest characteristics of the network comprise: self-organizing, relatively low costs of nodes, low power consumption of nodes, dynamic network topology changes, etc. A huge security loophole exists in the nodes deployed in the wireless system, and would be easily manipulated physically by an attacker. With regard to a security loophole at a message signature end, one can use some reasonable technical solutions for compensation, for example, a digital signature scheme may be used to solve this problem. Then, what kind of digital signature scheme may be applicable to the wireless system? What comes first is definitely security. If the signature is easy to be counterfeited, then the entire scheme would be meaningless; and then, we should take the computing capacity, energy consumption and storage space of the message signature end into consideration, and choose a signature scheme which will not cause a very great influence on the performance of the message signature end as much as possible. Comprehensively considering security, energy consumption and storage space, a multivariate public key cryptosystem (MPKC) is a good choice. In addition, in order to further reduce the computing overhead and storage overhead of a signature process on a wireless message signature end, an online/offline signature scheme is a better choice. This scheme may put more computing and storage in the offline stage, and is executed by a KDC end in the wireless system, with the actual signature process being placed in the online stage and being operated by a sensor. So that the signature scheme is enabled to conform to the characteristics of the system to a greater extent.

However, at present, the online/offline signature scheme for multivariate public key cryptography has not been proposed yet, and a multivariate signature system used on the wireless system has not been implemented yet either.

SUMMARY OF THE INVENTION

Embodiments of the present invention overcome the disadvantages and shortcomings of the prior art, and provide an online/offline signature system based on multivariate cryptography.

Embodiments, of the present invention to provide an online/offline signature method based on multivariate cryptography.

Embodiments of the present invention include the following technical solutions:

an online/offline signature system based on multivariate cryptography, comprising
a KDC end (the KDC being a key distribution center) for enabling building of a KDC end, which comprises a key generating module, an offline signature module, and a verification module connected sequentially, wherein the key generating module generates a public-private key pair with a reduced public key length; the offline signature module comprises a random message and vinegar variable generating component and a UOV signature component, the random message and vinegar variable generating component generating and transferring a random message and a value of a vinegar variable to the UOV signature component for signature, and the UOV signature component returning a message and a corresponding signature, while transmitting the result to a message signature end for storage; and the verification module comprises a public key transformation component, the signature being transmitted to the public key transformation component, and the signature being substituted into various multivariate polynomials in public key mapping for determining whether obtained data is equal to a message in a memory, and if so, then the signature being valid, and if not, then the signature being invalid;
and the message signature end for building the KDC end of the system, which comprises an online signature module and a verification module, wherein the online signature module comprises an affine transformation component, a linear conversion component, and an affine transformation inversion component connected sequentially, a message to be signed being subjected to affine transformation, linear conversion and affine transformation inversion computing successively, then a generated signature being transmitted to the verification module together with the message; and the verification module comprises a public key transformation component, the signature being transmitted to the public key transformation component, and the signature being substituted into various multivariate polynomials in public key mapping for determining whether obtained data is equal to a message in a memory, and if so, then the signature being valid, and if not, then the signature being invalid.

In some embodiments, since the function and design components are identical, the verification module of the KDC end and the verification module of the message signature end share the same verification module.

The key generating module comprises a UOV parameter generating component, and a public key length reducing and key computing component connected sequentially, wherein the UOV parameter generating component is from a basic UOV signature scheme, and when the component requires to be called, a generating algorithm nested in the component is called to generate a UOV system parameter; and the public key length reducing and key computing component comprises a UOV public key reducing algorithm and a key computing algorithm, and when the component is called, a system parameter is input at the KDC end and a corresponding UOV public-private key pair is output.

The online/offline signature system based on multivariate cryptography further comprises a selector, wherein when the selector is in an on state, the signature module of the system works, and when the selector is in an off state, the verification module of the system works. In a general signature/verification system, user I performs signature processing on a message to be signed using a signature module; after a signature is formed, the signature and the original message are transmitted to user II; and user II uses a verification module to verify whether the signature is valid, and the two form an integral signature/verification system, or vice versa: user II signs using the signature module; after a signature is formed, the signature and the original message are transmitted to user I; and user I uses the verification module to verify whether the signature is valid. Therefore, one and the same user requires to have two different and independent apparatuses at the same time, i.e., the signature module and the verification module, to satisfy the requirements, which brings about inconvenience to the user. Nevertheless, the multivariate public key signature/verification system uses a scheme comprising a selector, and one and the same user only requires one and the same apparatus. The user chooses the apparatus to perform signature or verification according to his/her requirements, which is very convenient.

The online/offline signature system based on multivariate cryptography further comprises a scheduler connected to the selector, wherein the on state and off state of the selector are recognized and processed by the scheduler, and stored data is controlled and scheduled by the scheduler to various corresponding components for corresponding operations.

Embodiments of the present invention include the following technical solution:

an online/offline signature method based on multivariate cryptography, comprising the following sequential steps:

(1) a KDC end performing a key generation process:
a. after receiving a security parameter, a KDC end generating keys used by an entire system;
b. in the process of key generation, the system requiring to use a public key reducing algorithm by means of which the design of a public key P with a reduced length is achievable;
c. according to the above designed public key, randomly generating an affine transformation T, and then computing a corresponding Q; and
d. the result finally obtained serving as public and private keys required to be used by the system, and a processor transmitting the message and a signature thereof together to a terminal user;

(2) a signature process:
a. performing an offline signature process in the KDC end first, and storing the result generated by the offline signature process in a message signature end requiring online signature in the next step; and
b. after receiving a message to be signed, the message signature end taking the message as an input and performing an online signature process, and finally generating a corresponding signature; and (3) a verification process:
a. the verification process being capable of running on the KDC end or the message signature end, the message and the signature thereof being transmitted to a corresponding processor, and the processor storing the message and the signature thereof and then transmitting the signature to a public key transformation component; and
b. the public key transformation component substituting the signature into various multivariate polynomials of public key mapping, returning obtained data to the processor, and the processor determining whether the data is equal to a stored message: if so, the processor outputting "1" to the terminal user, indicating that the signature is valid; and if not, the processor outputting "0" to the terminal user, indicating that the signature is invalid.

In step (2), the offline signature process comprises the following steps:
a. given corresponding keys Q and T, in the offline signature process, the processor first randomly generating o+1 messages ($m_1$, $m_2$, ..., $m_{o+1}$), with a message length being o, then the processor randomly selecting a vinegar variable vector value $x_v \in k^v$, and then utilizing this vinegar variable vector to run an original UOV signature algorithm to sign the o+1 messages, and the obtained result being ($cert_1$, $cert_2$, ..., $cert_{o+1}$); and
b. then transmitting ($m_1$, $m_2$, ..., $m_{o+1}$) and ($cert_1$, $cert_2$, ..., $cert_{o+1}$) to the message signature end for storage, and the parameter being input as a part of an online signature of a sensor.

In step (2), the online signature process comprises the following steps:
a. given a message $m \in k^o$ to be signed, in the online signature process, the message signature end first performing T affine transformation for ($cert_1$, $cert_2$, ..., $cert_{o+1}$), i.e., computing $cert_{T_i} = T(cert_i)$, $i = \{1, ..., o+1\}$;
b. with regard to messages ($m_1$, $m_2$, ..., $m_{o+1}$) and ($cert_1$, $cert_2$, ..., $cert_{o+1}$), subtracting a (o+1)th item from the first o items thereof respectively, i.e.:

$$(m_1' = m_1 - m_{o-1}, \ldots, m_o' = m_o - m_{o+1})$$

and $$(cert_1' = cert_{T_1} - cert_{T_{o+1}}, \ldots, cert_o' = cert_{T_o} - cert_{T_{o+1}});$$

c. letting $m' = m\ m_{o+1}$, and constructing an arbitrary linear combination with a base of ($m_1'$, $m_2'$, ..., $m_o'$) for m', denoted as $m_1' = \alpha_1 m_1' + \alpha_2 m_2' + \ldots + \alpha_o m_o'$;
d. computing $cert = cert_{T_{o+1}} + \alpha_1 cert_1' + \alpha_2 cert_2' + \ldots + \alpha_o cert_o'$; and
e. finally, performing affine inversion for T on cert, i.e., computing $X = T^{-1}(cert)$. Step S3 specifically comprises the following steps:

a. a message $(y_1', \ldots, y_n')$ and a signature $X=(x_1', \ldots, x_n')$ thereof being transmitted to the processor, and the processor storing same and then transmitting the signature $(x_1', \ldots, x_n')$ to the public key transformation component; and b. the public key transformation component substituting the signature $(x_1', \ldots, x_n')$ into various multivariate polynomials of public key mapping $P(x_1, \ldots, x_n)$, i.e., computing $p_1(x_1', \ldots, x_n'), \ldots, p_n(x_1', \ldots, x_n')$, and denoting values thereof as $y_1'', \ldots, y_n''$ respectively, the public key transformation component transmitting $y_1'', \ldots, y_n''$ to the processor, and the processor determining whether $y_1'', \ldots, y_n''$ is equal to the originally stored message $(y_1', \ldots, y_n')$: if so, the processor outputting "1" to the terminal user, indicating that the signature is valid; and if not, the processor outputting "0" to the terminal user, indicating that the signature is invalid.

Embodiments of the present invention provide the following advantages and beneficial effects:

Firstly, with appropriate parameter selection, algebraic attacks of multivariate public key cryptography currently known can be resisted, and the security is high. The security of the present scheme is consistent with the security of the traditional multivariate public key signature algorithm.

Secondly, the signature scheme used in the present invention is an online/offline signature scheme. The scheme effectively puts operations with a large amount of computing and storage in the offline stage, which are executed by a KDC end of a wireless system, while the actual signature process is therefore significantly optimized, and is executed by a wireless message signature end.

Thirdly, by comparing the present scheme with a currently popular multivariate public key signature algorithm UOV, the optimized results are as shown in Table 1 (assuming that parameter selection is (q=256, m=o=26, v=52, n=78)).

TABLE 1

Table of comparison between the present invention and the prior art

|  | UOV (multivariate public key signature) | Signature scheme of the present patent |
|---|---|---|
| Overhead of signature process | Gaussian elimination + multiplication (over field) | Multiplication (over field) |
| Overhead of verification process | Multiplication (over field) | Multiplication (over field) |
| Key size required for signature | mov + mv(v + 1)/2 + (m + n)(n + 1) = 77.3 KB | (o + 1)(\|message\| + \|cert\|) + n(n + 1) = 8.8 KB |
| Signature size | n = 624 bits | n = 624 bits |
| Storage space required for public-private keys | mov + mv(v + 1)/2 + (m + n)(n + 1) + m(n + 1)(n + 2)/2 = 157.5 KB | (o + 1)(\|message\| + \|cert\|) + n(n + 1) + m((n + 1)(n + 2) − 2D)/2 + D = 22.4 KB |

It can be seen from Table 1 that, in the signature scheme of embodiments of the present invention, the signature process reduces one Gaussian elimination arithmetic operation compared to the traditional multivariate signature scheme UOV in terms of computing efficiency, that is, the computing overhead of $O(n^3)$ is approximately reduced. On the other hand, in terms of storage efficiency, the signature scheme of embodiments of the present invention reduces 88.6% compared to the UOV scheme with regard to the key size required for signature, and with regard to the storage space required by the entire scheme, the signature scheme of embodiments of the present invention also reduces 85.8% compared to UOV. The present invention has been greatly improved both in terms of computing efficiency and storage efficiency.

BRIEF DESCRIPTION OF THE DRAWINGS

FIG. 1 is a schematic structural diagram of an online/offline signature system based on multivariate cryptography of the present invention.

DETAILED DESCRIPTION OF THE INVENTION

The present invention will be further described in detail below in conjunction with embodiments and accompanying drawings, but this does not limit the implementation of the present invention.

As shown in FIG. 1, an online/offline signature system based on multivariate cryptography, comprising:

A. A KDC end part for enabling building of a KDC end part of the system, which comprises a key generating module, an offline signature module, and a verification module. The key generating module comprises a UOV parameter generating component, and a public key length reducing and key computing component. By sequentially executing a security parameter by various components, finally the module generates a public-private key pair with a reduced public key length; the offline signature module comprises a random message and vinegar variable generating component and a UOV signature component, in the module, using the above components, the system generating and transferring a random message and a value of a vinegar variable to the UOV signature component for signature, and finally the signature component returning a message and a corresponding signature, and transmitting the result to a message signature end for storage; and the verification module comprises a public key transformation component, a processor transmitting the signature to the public key transformation component, and substituting the signature into various multivariate polynomials in public key mapping, and the processor determining whether obtained data is equal to a message in a memory, and if so, then the signature being valid, and if not, then the signature being invalid; and B. A message signature end part for building the KDC end part of the system, which comprises an online signature module and a verification module. The online signature module comprises an affine transformation component, a linear conversion component, and an affine transformation inversion component, in the module, after corresponding operations are executed on a message to be signed by various components sequentially, a generated signature being transmitted to the processor together with the message; and the verification module comprises a public key transformation component, a processor transmitting the signature to the public key transformation component, and substituting the signature into various multivariate polynomials in public key mapping, and the processor determining whether obtained data is equal to a message in a memory, and if so, then the signature being valid, and if not, then the signature being invalid.

Before the multivariate public key signature/verification system is used for the first time, initialization may be performed, and the initialization process is as shown below:

(1) firstly determining system parameters of the entire system, comprising: all the arithmetic operations of the system are based on a finite field k of order q, where n is the number of variables of multivariate polynomials, m is the number of multivariate polynomials, and o and v are respectively the numbers of oil and vinegar variables;

(2) the KDC end using the following key generating algorithm (algorithm 1) to generate public-private keys required by the scheme for the system, wherein the public key is one that uses a cyclic matrix form, which can thus reduce the length of the public key;

Algorithm 1 Key Generating Algorithm

---

Algorithm 1  KeyGen((k, o, v, D))
Input:
k: base field
o, v: oil and vinegar variables
D: non-zero quadratic term, D = v(v + 1)/2 + ov.
Output:
(T, Q): Private key of corresponding UOV
P: Public key of UOV
Start
  1. randomly selecting a variable b = ($b_0$, ..., $b_{D-1}$);
  2. randomly selecting an n × n invertible matrix T;
  3. setting coefficients of the first D columns in the polynomial in P as $p_{ij} = b_{(j-i)}$ mod D;
  4. computing a coefficient of a quadratic term in central mapping Q by means of the relationship P = QT;
  5. then randomly selecting coefficients of a first term and a constant term in Q;
  6. computing coefficients of the remaining terms in P by means of Q and T; and
  7. returning P, Q, T;
End

---

(3) A Signature Process:

a. performing an offline signature process in the KDC end first, and storing the result generated by the offline signature process in a message signature end requiring online signature in the next step; and b. after receiving a message to be signed, the message signature end taking the message as an input and performing an online signature process, and finally generating a corresponding signature.

(4) A Verification Process:

a. the verification process being capable of running on the KDC end or the message signature end, the message and the signature thereof being transmitted to a corresponding processor, and the processor storing the message and the signature thereof and then transmitting the signature to a public key transformation component; and b. the public key transformation component substituting the signature into various multivariate polynomials of public key mapping, returning obtained data to the processor, and the processor determining whether the data is equal to a stored message: if so, the processor outputting "1" to the terminal user, indicating that the signature is valid; and if not, the processor outputting "0" to the terminal user, indicating that the signature is invalid.

wherein the offline signature process in step (3) further comprises:

a. given corresponding keys Q and T, in the offline signature process, the processor first randomly generating o+1 messages ($m_1, m_2, \ldots, m_{o+1}$), with a message length being o, then the processor randomly selecting a vinegar variable vector value $x_v \in k^v$, and then utilizing this vinegar variable vector to run an original UOV signature algorithm to sign the o+1 messages, and the obtained result being ($cert_1$, $cert_2, \ldots, cert_{o+1}$); and b. then transmitting ($m_1, m_2, \ldots, m_{o+1}$) and ($cert_1$, $cert_2, \ldots, cert_{o+1}$) to the message signature end for storage, and the parameter being input as a part of an online signature of a sensor;

at the same time, the online signature process in step (3) further comprises:

a. given a message $m \in k^o$ to be signed, in the online signature process, the message signature end first performing T affine transformation for ($cert_1, cert_2, \ldots, cert_{o+1}$), i.e., computing $cert_{T_i} = T(cert_i)$, i={1, ..., o+1};

b. with regard to messages ($m_1, m_2, \ldots, m_{o+1}$) and ($cert_{T_1}, cert_{T_2}, \ldots, cert_{T_{o+1}}$), subtracting (o+1)th item from the first o items thereof respectively, i.e., ($m_1' = m_1 - m_{o-1}, \ldots, m_o' = m_o - m_{o+1}$) and ($cert_1' = cert_{T_1} - cert_{T_{o+1}}, \ldots, cert_o' = cert_{T_o} - cert_{T_{o+1}}$);

c. letting $m' = m - m_{o+1}$, and constructing an arbitrary linear combination with a base of ($m_1', m_2', \ldots, m_o'$) for m', denoted as $m_1' = \alpha_1 m_1' + \alpha_2 m_2' + \ldots + \alpha_o m_o'$;

d. computing $cert = cert_{T_{o+1}} \alpha_1 cert_1' + \alpha_2 cert_2' + \ldots + \alpha_o cert_o'$; and e. finally, performing affine inversion for T on cert, i.e., computing $X = T^{-1}(cert)$; and finally, the verification process in step (4) comprises:

a. a message $y_1', \ldots, y_n'$ and a signature $X = (x_1', \ldots, x_n')$ thereof being transmitted to the processor, and the processor storing same and then transmitting the signature ($x_1', \ldots, x_n'$) to the public key transformation component; and b. the public key transformation component substituting the signature ($x_1', \ldots, x_n'$) into various multivariate polynomials of public key mapping $P(x_1, \ldots, x_n)$, i.e., computing $p_1(x_1', \ldots, x_n'), \ldots, p_n(x_1', \ldots, x_n')$, and denoting values thereof as $y_1'', \ldots, y_n''$ respectively, the public key transformation component transmitting $y_1'', \ldots, y_n''$ to the processor, and the processor determining whether $y_1'', \ldots, y_n''$ is equal to the originally stored message ($y_1', \ldots, y_n'$): if so, the processor outputting "1" to the terminal user, indicating that the signature is valid; and if not, the processor outputting "0" to the terminal user, indicating that the signature is invalid.

The recommended system parameters of the present invention are: q=256, n=78, v=52 and m=o=26, and the security level thereof can reach $2^{80}$.

The above embodiments are preferred implementations of the present invention. However, the implementation of the present invention is not limited by the above embodiments, and any alternation, modification, substitution, combination and simplification without departing from the spiritual essence and principles of the present invention should all be equivalent replacement methods, and all fall within the scope of protection of the present invention.

The invention claimed is:

1. An online/offline signature system based on multivariate cryptography, comprising:

a KDC end for enabling building of a KDC end, which comprises a key generating module, an offline signature module, and a verification module connected sequentially, wherein the key generating module generates a public-private key pair with a reduced public key length; the offline signature module comprises a random message and vinegar variable generating component and a UOV signature component, the random message and vinegar variable generating component generating and transferring a random message and a value of a vinegar variable to the UOV signature component for signature, and the UOV signature component returning a message and a corresponding signature, while transmitting the result to a message signature end for storage; and the verification module comprises a public key transformation component, the signature being transmitted to the public key transformation component, and the signature being substituted into various multivariate polynomials in public key mapping for determining whether obtained data is equal to a message in a memory, and if so, then the signature being valid, and if not, then the signature being invalid;

and the message signature end for building the KDC end of the system, which comprises an online signature module and a verification module, wherein the online signature module comprises an affine transformation component, a linear conversion component, and an affine transformation inversion component connected sequentially, a message to be signed being subjected to affine transformation, linear conversion and affine transformation inversion computing successively, then a generated signature being transmitted to the verification module together with the message; and the verification module comprises a public key transformation component, the signature being transmitted to the public key transformation component, and the signature being substituted into various multivariate polynomials in public key mapping for determining whether obtained data is equal to a message in a memory, and if so, then the signature being valid, and if not, then the signature being invalid.

2. The online/offline signature system based on multivariate cryptography according to claim 1, wherein the key generating module comprises a UOV parameter generating component, and a public key length reducing and key computing component connected sequentially, wherein the UOV parameter generating component is from a basic UOV signature scheme, and when the component requires to be called, a generating algorithm nested in the component is called to generate a UOV system parameter; and the public key length reducing and key computing component comprises a UOV public key reducing algorithm and a key computing algorithm, and when the component is called, a system parameter is input at the KDC end and a corresponding UOV public-private key pair is output.

3. The online/offline signature system based on multivariate cryptography according to claim 1, further comprising a selector, wherein when the selector is in an on state, the signature module of the system works, and when the selector is in an off state, the verification module of the system works.

4. The online/offline signature system based on multivariate cryptography according to claim 3, further comprising a scheduler connected to the selector, wherein the on state and off state of the selector are recognized and processed by the scheduler, and stored data is controlled and scheduled by the scheduler to various corresponding components for corresponding operations.

5. An online/offline signature method based on multivariate cryptography, comprising the following sequential steps:
(1) a KDC end performing a key generation process:
a. after receiving a security parameter, a KDC end generating keys used by an entire system;

b. in the process of key generation, the system requiring to use a public key reducing algorithm by means of which the design of a public key P with a reduced length is achievable;

c. according to the above designed public key, randomly generating an affine transformation T, and then computing a corresponding Q; and d. the result finally obtained serving as public and private keys required to be used by the system, and a processor transmitting the message and a signature thereof together to a terminal user;

(2) a signature process:

a. performing an offline signature process in the KDC end first, and storing the result generated by the offline signature process in a message signature end requiring online signature in the next step; and b. after receiving a message to be signed, the message signature end taking the message as an input and performing an online signature process, and finally generating a corresponding signature; and (3) a verification process:

a. the verification process being capable of running on the KDC end or the message signature end, the message and the signature thereof being transmitted to a corresponding processor, and the processor storing the message and the signature thereof and then transmitting the signature to a public key transformation component; and b. the public key transformation component substituting the signature into various multivariate polynomials of public key mapping, returning obtained data to the processor, and the processor determining whether the data is equal to a stored message: if so, the processor outputting "1" to the terminal user, indicating that the signature is valid; and if not, the processor outputting "0" to the terminal user, indicating that the signature is invalid.

6. The online/offline signature method based on multivariate cryptography according to claim 5, wherein, in step (2), the offline signature process comprises the following steps:

a. given corresponding keys Q and T, in the offline signature process, the processor first randomly generating o+1 messages ($m_1$, $m_2$, . . . , $m_{o+1}$), with a message length being o, then the processor randomly selecting a vinegar variable vector value $x_v \in k^v$, and then utilizing this vinegar variable vector to run an original UOV signature algorithm to sign the o+1 messages, and the obtained result being ($cert_1$, $cert_2$, . . . , $cert_{o+1}$); and b. then transmitting ($m_1$, $m_2$, . . . , $m_{o+1}$) and ($cert_1$, $cert_2$, . . . , $cert_{o+1}$) to the message signature end for storage, and the parameter being input as a part of an online signature of a sensor.

7. The online/offline signature method based on multivariate cryptography according to claim 5, wherein, in step (2), the online signature process comprises the following steps:

a. given a message $m \in k^o$ to be signed, in the online signature process, the message) signature end first performing T affine transformation for ($cert_1$, $cert_2$, . . . , $cert_{o+1}$), i.e., computing $cert_{T_i} = T(cert_i)$, $i = \{1, . . . , o+1\}$;

b. with regard to messages $(m_1, m_2, \ldots m_{o+1})$ and $(cert_{T_1}, cert_{T_2}, \ldots, cert_{T_{o+1}})$, subtracting a (o+1)th item from the first o items thereof respectively, i.e.:

$$(m_1'=m_1-m_{o+1}, \ldots, m_o'=m_o-m_{o+1})$$

and $$(cert_1'=cert_{T_1}-cert_{T_{o+1}}, \ldots, cert_o'=cert_{T_o}-cert_{T_{o+1}})$$

c. letting $m'=m-m_{o+1}$, and constructing an arbitrary linear combination with a base of $(m_1', m_2', \ldots, m_o')$ for m', denoted as $m_1'=\alpha_1 m_1'+\alpha_2 m_2'+ \ldots +\alpha_o m_o'$;

d. computing $cert=cert_{T_{o+1}}+\alpha_1 cert_1'+\alpha_2 cert_2'+ \ldots +\alpha_o cert_o'$; and e. finally, performing affine inversion for T on cert, i.e., computing $X=T^{-1}(cert)$.

8. The online/offline signature method based on multivariate cryptography according to claim 5, wherein the step specifically comprises the following steps:

a. a message $(y_1', \ldots, y_n')$ and a signature $X=(x_1', \ldots, x_n')$ thereof being transmitted to the processor, and the processor storing same and then transmitting the signature $(x_1', \ldots, x_n')$ to the public key transformation component; and b. the public key transformation component substituting the signature $(x_1', \ldots, x_n')$ into various multivariate polynomials of public key mapping $P(x_1, \ldots, x_n)$, i.e., computing $p_1(x_1', \ldots, x_n'), \ldots, p_n(x_1', \ldots, x_n')$, and denoting values thereof as $y_1'', \ldots, y_n''$ respectively, the public key transformation component transmitting $y_1'', \ldots, y_n''$ to the processor, and the processor determining whether $y_1'', \ldots, y_n''$ is equal to the originally stored message $y_1', \ldots, y_n'$): if so, the processor outputting "1" to the terminal user, indicating that the signature is valid; and if not, the processor outputting "0" to the terminal user, indicating that the signature is invalid.

* * * * *

UNITED STATES PATENT AND TRADEMARK OFFICE
CERTIFICATE OF CORRECTION

PATENT NO. : 10,623,189 B2
APPLICATION NO. : 15/761838
DATED : April 14, 2020
INVENTOR(S) : Shaohua Tang Page 1 of 1

It is certified that error appears in the above-identified patent and that said Letters Patent is hereby corrected as shown below:

In the Claims

Column 8, Line 59, Claim 1, after "KDC" insert -- (Key Distribution Center) --

Column 8, Line 66, Claim 1, after "UOV" insert -- (Unbalanced Oil and Vinegar) --

Column 9, Line 65, Claim 5, after "KDC" insert -- (Key Distribution Center) --

Column 10, Line 51, Claim 6, after "UOV" insert -- (Unbalanced Oil and Vinegar) --

Column 10, Line 64, Claim 7, delete "message)" and insert -- message --

Column 11, Line 1, Claim 7, delete "$(m_1, m_2, \ldots m_{o+1})$" and insert -- $(m_1, m_2, \ldots, m_{o+1})$ --

Column 11, Line 8, Claim 7, after "$-cert_{To+1}$)" insert -- ; --

Column 12, Line 13, Claim 8, delete "$y_1', \ldots, y_n'$):" and insert -- $(y_1', \ldots, y_n')$: --

Signed and Sealed this
Thirteenth Day of October, 2020

Andrei Iancu
*Director of the United States Patent and Trademark Office*